US006463573B1

(12) United States Patent
Maddalozzo, Jr. et al.

(10) Patent No.: US 6,463,573 B1
(45) Date of Patent: Oct. 8, 2002

(54) DATA PROCESSOR STORAGE SYSTEMS WITH DYNAMIC RESYNCHRONIZATION OF MIRRORED LOGICAL DATA VOLUMES SUBSEQUENT TO A STORAGE SYSTEM FAILURE

(75) Inventors: John Maddalozzo, Jr.; Gerald Francis McBrearty; Johnny Meng-Han Shieh, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/325,405

(22) Filed: Jun. 3, 1999

(51) Int. Cl.$^7$ ................................................ G06F 11/00

(52) U.S. Cl. ............................................... 716/6; 714/5

(58) Field of Search .............................. 714/5, 6, 2, 15; 707/202, 204

(56) References Cited

U.S. PATENT DOCUMENTS

| | | | | |
|---|---|---|---|---|
| 5,432,922 A | * | 7/1995 | Polyzois et al. ............. | 707/204 |
| 5,459,857 A | * | 10/1995 | Ludlam et al. ................ | 714/6 |
| 5,708,769 A | * | 1/1998 | Stallmo ......................... | 714/6 |
| 5,917,998 A | * | 6/1999 | Cabrera et al. ............. | 711/114 |
| 5,987,575 A | * | 11/1999 | Yamaguchi .................. | 707/203 |
| 6,151,665 A | * | 11/2000 | Blumenau ................... | 707/202 |
| 6,173,377 B1 | * | 1/2001 | Yanai et al. ................. | 711/154 |
| 6,178,427 B1 | * | 1/2001 | Parker ......................... | 707/202 |
| 6,216,211 B1 | * | 4/2001 | McBrearty et al. ......... | 711/162 |

OTHER PUBLICATIONS

IBM Technical Disclosure Bulletin "Three Challenges in the Implementation of Disk Mirroring" Sep. 1, 1990; vol. 33, issue 4, pp. 14–20.*

* cited by examiner

Primary Examiner—Robert Beausoleil
Assistant Examiner—Bryce P Bonzo
(74) Attorney, Agent, or Firm—J. B. Kraft; Volel Emile; Thomas E. Tyson

(57) ABSTRACT

There is provided a system for dynamically resynchronizing a storage system made up of a plurality of mirrored logical volumes respectively divided into a plurality of mirrored logical data partitions in the event of a system failure. Immediately after the correction of the problem causing the failure, meals start to resynchronize the plurality of logical volumes but without waiting for the resynchronization to be completed; means access data from a data partition in one of said logical volumes. Then there are means for determining whether the portion of the logical volume containing the accessed partition has already been resynchronized, together with means responsive to these determining means for replacing the corresponding data in the other mirrored partitions in the logical volume with the accessed data, in the event that the portion of the logical volume has not been resynchronized. The means for replacing the data in the other mirrored partitions in the logical volume containing the accessed partition may replace the data prior to resynchronization of the logical volume or it may replace the data during the subsequent resynchronization of the logical volume. In the implementation where the data in the other mirrored partitions is replaced during resynchronization, then there is provided interim means responsive to the accessing of data from the data partition in said logical volume for indicating the partition as accessible and for indicating the other mirrored partitions in the logical volume as inaccessible.

21 Claims, 5 Drawing Sheets

DATA PROCESSOR STORAGE SYSTEMS WITH DYNAMIC RESYNCHRONIZATION OF MIRRORED LOGICAL DATA VOLUMES SUBSEQUENT TO A STORAGE SYSTEM FAILURE

TECHNICAL FIELD

The present invention is directed to methods and programs for computer storage systems conventionally implemented in disk drive storage and, more particularly, to stored data recovery by resynchronization of stored mirrored logical data volumes after storage system failures or like problems.

BACKGROUND OF RELATED ART

In the current data processing environment, there has been a dramatic increase in the availability and capacity of computer storage systems, such as hard disk drives and optical drives. Present storage systems associated with workstations may have conventional capacities up to hundreds of gigabytes. However, because of these increased capacities, problems have arisen in storage system recovery after a system failure or a like problem. This is particularly the case in storage systems which use mirrored stored logical data volumes. Mirroring is the implementation where the operating system makes a plurality of copies of data (usually duplicate or triplicate copies) in order to make data recovery easier in the event of a system failure or a similar problem. However, all mirrored storage systems require a system resynchronization after a failure. This will resynchronize all noncurrent physical volume partitions used in the mirroring to represent the logical volume partitions of the logical volume group.

By way of background, most AIX™ and UNIX™ based operating systems use some form of stored data mirroring. A basic storage system may be considered to be a hierarchy managed by a logical volume manager and made up of logical volume groups, which are in turn made up of a plurality of logical volumes which are physically represented by physical volumes on the actual disk or hard drives. Each physical volume is divided into physical partitions which are equal size segments on a disk, i.e. the actual units of space allocation. Data on logical volumes appears to be contiguous to the user but can be noncontiguous on the physical volume. This allows file systems and other logical volumes to be resized and relocated, span multiple physical volumes and have their contents replicated for greater flexibility and availability in the storage of data. In mirrored systems, a logical volume is divided into a plurality of mirrored logical data partitions, i.e. each logical volume has two or three redundant partitions therein. Such logical and physical volumes are generally described in the text, *AIX 6000 System Guide*, Frank Cervone, McGraw-Hill, N.Y., 1996, pp. 53–56.

In any event, when mirrored logical volumes (LVs) are first brought on-line or initiated, they must be synchronized. In mirrored LVs, each partition of the mirror can have two states: stale or available (unstale). Data may be read from any unstale mirrored partition. On the other hand, in writing, the data must be written to all available (unstale) mirrored partitions before returning. Only partitions that are marked as unstale will be read and written. In synchronization, or in resynchronization, a command such as the AIX "syncvg" command is run which copies information from an unstale mirror partition to the stale mirror partition, and changes the partition designation from stale to unstale.

In systems with mirrored partitions, after a system failure, e.g. a hangup or a crash, the LVs must be resynchronized. In present practice, this resynchronization must take place before the storage system may be accessed again; otherwise, the user may get inconsistent data. This is likely to result from "writes" in flight at the time of the crash which may not be completed and which may cause mirrored partitions to have different data. Reference is made to section 6.2.7, pp. 163–164, of the above-referenced Cervone text. Such resynchronization is usually done sequentially, LV by LV, and partition by partition. Because of the increased size of current storage systems and the large size groups of logical data volumes which may be involved in a resynchronization after a storage system, users may be subject to undesirable delays while waiting for the completion of synchronization in order to access the data from storage systems using mirrored volumes.

SUMMARY OF THE PRESENT INVENTION

The present invention overcomes these prior art problems of delays caused by resynchronization in mirrored LV storage systems by providing in systems made up of a plurality of mirrored LVs respectively divided into a plurality of mirrored logical data partitions, a system for dynamically resynchronizing in the event of a storage system problem. Immediately after the correction of the problem causing the failure, means start to resynchronize the plurality of LVs but without waiting for the resynchronization to be completed; means access data from a data partition in a portion of one of said LVs. Then, there are means for determining whether the portion of the LV containing the accessed partition has already been resynchronized prior to access, together with means responsive to these determining means for replacing data in the other mirrored partitions corresponding to the accessed data with the accessed data in said accessed partition in the event that the LV has not been resynchronized. The means for replacing the data in the other mirrored partitions in the LV containing the accessed partition may replace the data prior to resynchronization of the LV or it may replace the data during the subsequent resynchronization of the LV. In the implementation where the data in the other mirrored partitions are replaced during resynchronization, there is provided interim means responsive to the accessing of data from the data partition in said LV for indicating the partition as accessible and for indicating the other mirrored partitions in the LV as inaccessible, in combination with means for removing the indicators from said partitions upon resynchronization of said accessed set. In one embodiment, the means for indicating the partition as accessible is an unstale data indicator, and the means for indicating the other mirrored partitions as inaccessible is a stale data indicator.

The system preferably indicates whether a partition in a LV has been resynchronized. This may be done by a combination of means responsive to a storage system failure for setting a resynchronization indicator for each partition in said LVs, and means for removing said resynchronization indicator from each LV partition upon the resynchronization.

In the description of the present invention, we will refer to accessing data from a logical data partition and copying such accessed data from the accessed partition to its mirrored partition. It should be understood that the accessed data may be a data block which constitutes only a small portion of the accessed partition or its mirrored partition. Consequently, in the embodiment where the accessed data is copied prior to resynchronization, the accessed portion and its mirrored copy will be recopied along with the unaccessed data in the standard resynchronization process step for the whole mirrored data partition. In such a case, the initially copied data would provide temporary mirrored data consistency prior to resynchronization. Alternatively, a routine could be set up whereby those data portions of the mirrored partitions which are accessed and thus copied prior to resynchronization are tracked and an indicator thereof stored so that during the subsequent resynchronization such already copied portions would not be recopied.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
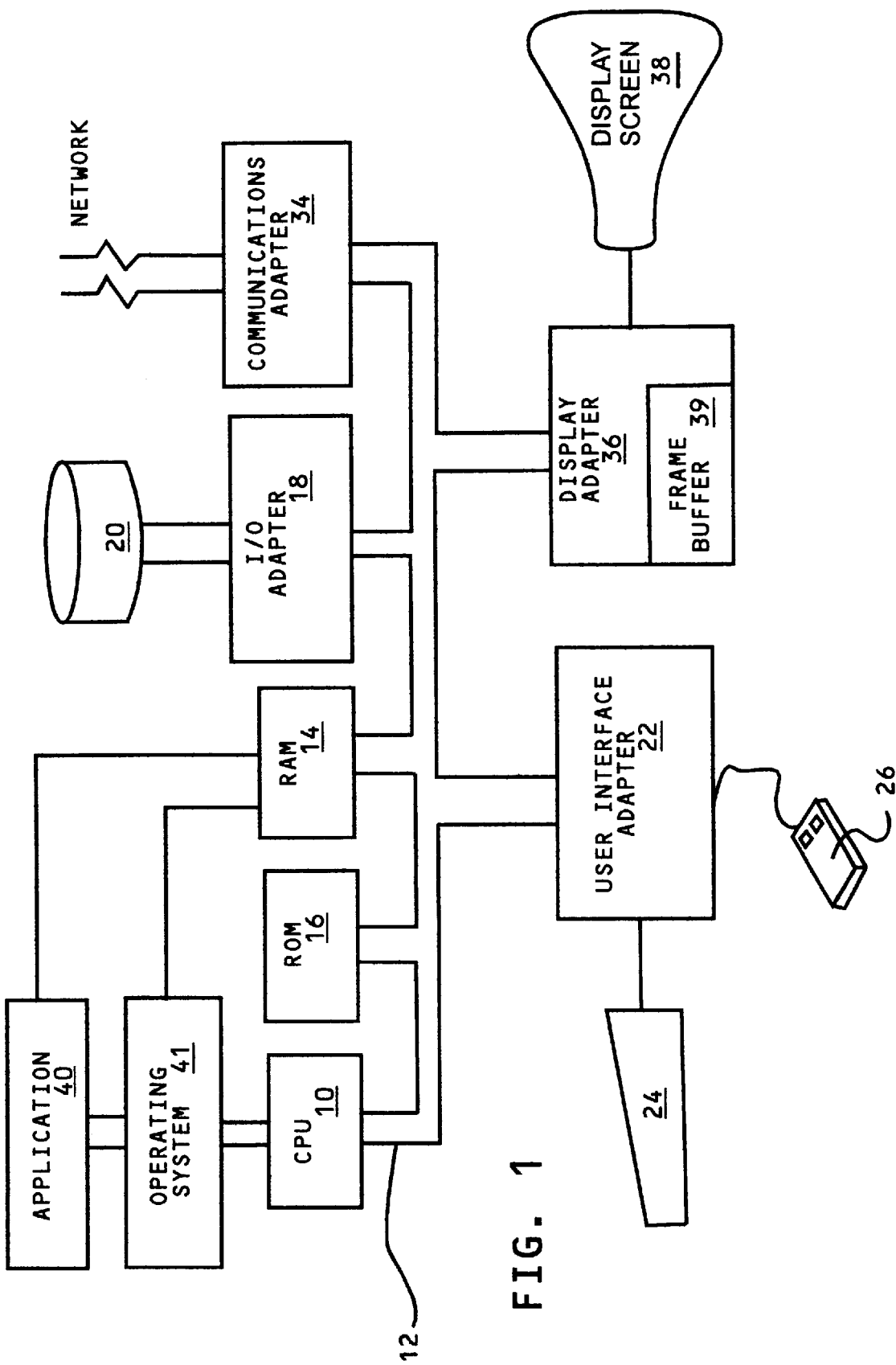
FIG. 1 is a block diagram of a data processing system including a central processing unit which is used to implement and control the present system for dynamic resynchronization of a data storage system after a system failure.

Referring to FIG. 1, a typical data processing system is shown which may function as a basic computer controlled system used in implementing the present invention of dynamic resynchronization of a computer storage system after a system failure. A central processing unit (CPU) 10, such as one of the PC microprocessors or workstations, e.g. RISC System/6000(RS/6000) series available from International Business Machines Corporation (IBM) (RISC System/6000 is a trademark of IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system, available from IBM or any UNIX™ operating system; Microsoft's Windows 95™ or Windows NT™. It is the operating system which provides for resynchronization of data storage after a failure. Consequently, the process of the present invention should be incorporated into the operating system for the most advantageous results. However, the present invention should also be operable as an application program ancillary to an operating system.

Application programs 40 and their calls, as controlled by the operating system, are moved into and out of the main memory, random access memory (RAM) 14, and consequently into and out of secondary storage, disk drive 20. As will be subsequently described, the physical volumes of data dealt with in the present invention are stored within disk drive 20. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24 and mouse 26 are all interconnected to bus 12 through user interface adapter 22. It is through such input devices that the user may interactively make calls to application programs. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

Figure 2:
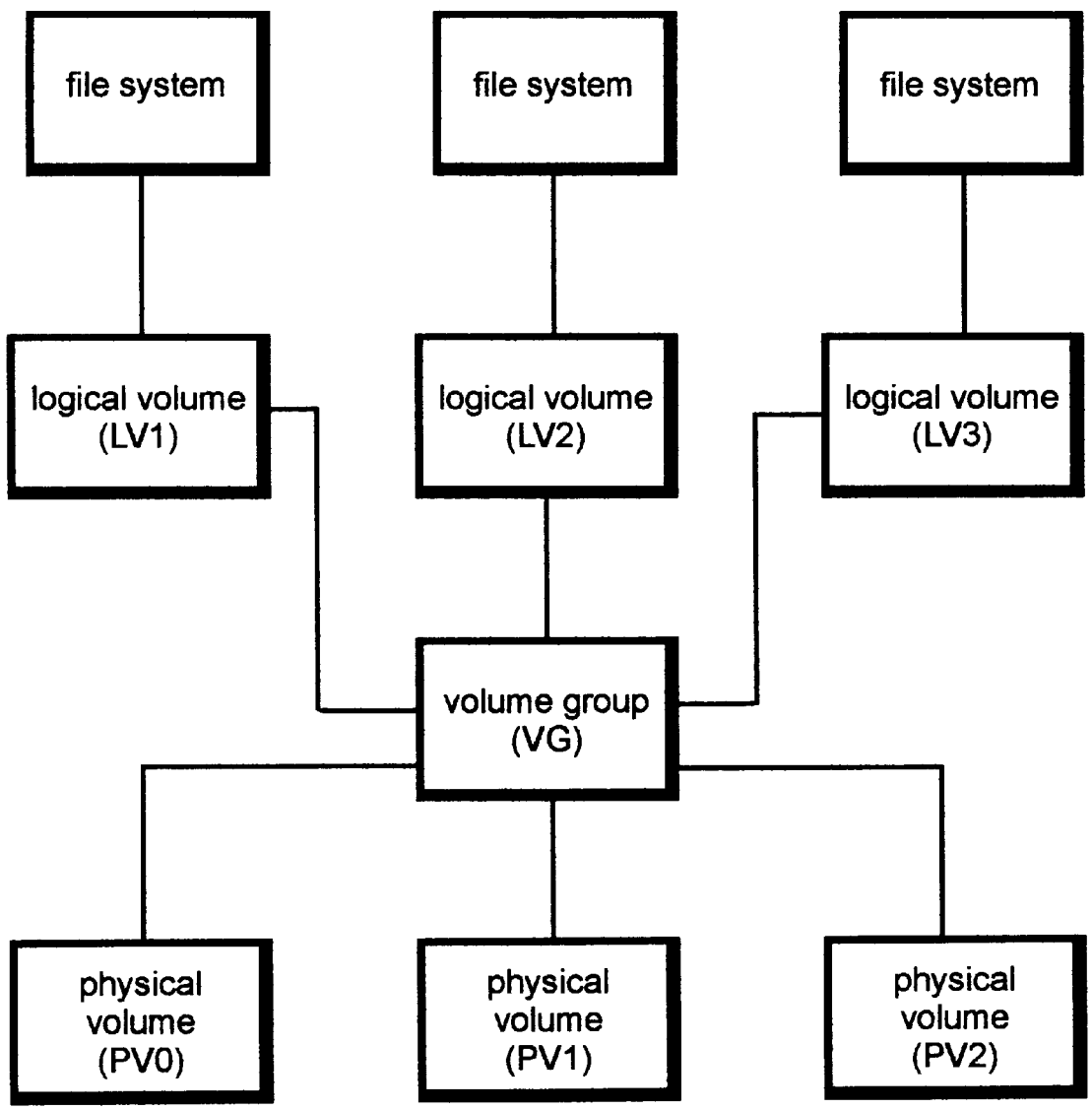
FIG. 2 is a logic diagram of a storage system on which the present invention may be implemented.

Now with respect to FIG. 2, we will describe the general logic components involved in the storage systems which are dynamically resynchronized in accordance with the present invention. The logic layer of FIG. 2 is imposed upon the physical storage facilities, e.g. disk drives. Each of the file systems is represented by a LV which is part of a volume group, which is made up of one or more physical volumes, e.g. the disk drives. A volume group is customarily a system wide logic implement consisting of up to 32 or more physical volumes of varying size. For example, an AIX system may have up to 255 volume groups. The main purpose of volume groups is to define a structure for the physical volumes on which the logical volumes exist. In a typical AIX operating system after installation, a single volume group will exist. This root group will normally contain all of the LVs needed to start the system. Each of the physical volumes is divided into physical partitions, i.e. equal sized segments of space on the disk drive, which are the units of allocation of disk space. Physical partition size is defined at the group level and can be any power of two from 1 to 256 Mbytes. The LVs are the implements by which multiple physical partitions which are presented to the user and the file system as if they were in one contiguous space. In current data storage systems using mirrored data storage, each LV consists of two or three logical partitions (LPs) containing identical data. These LPs are then stored on corresponding assigned physical partitions (PPs) on physical volumes (PVs) which of course need not be contiguous or correspond to the LPs in relative positions.

Figure 3:
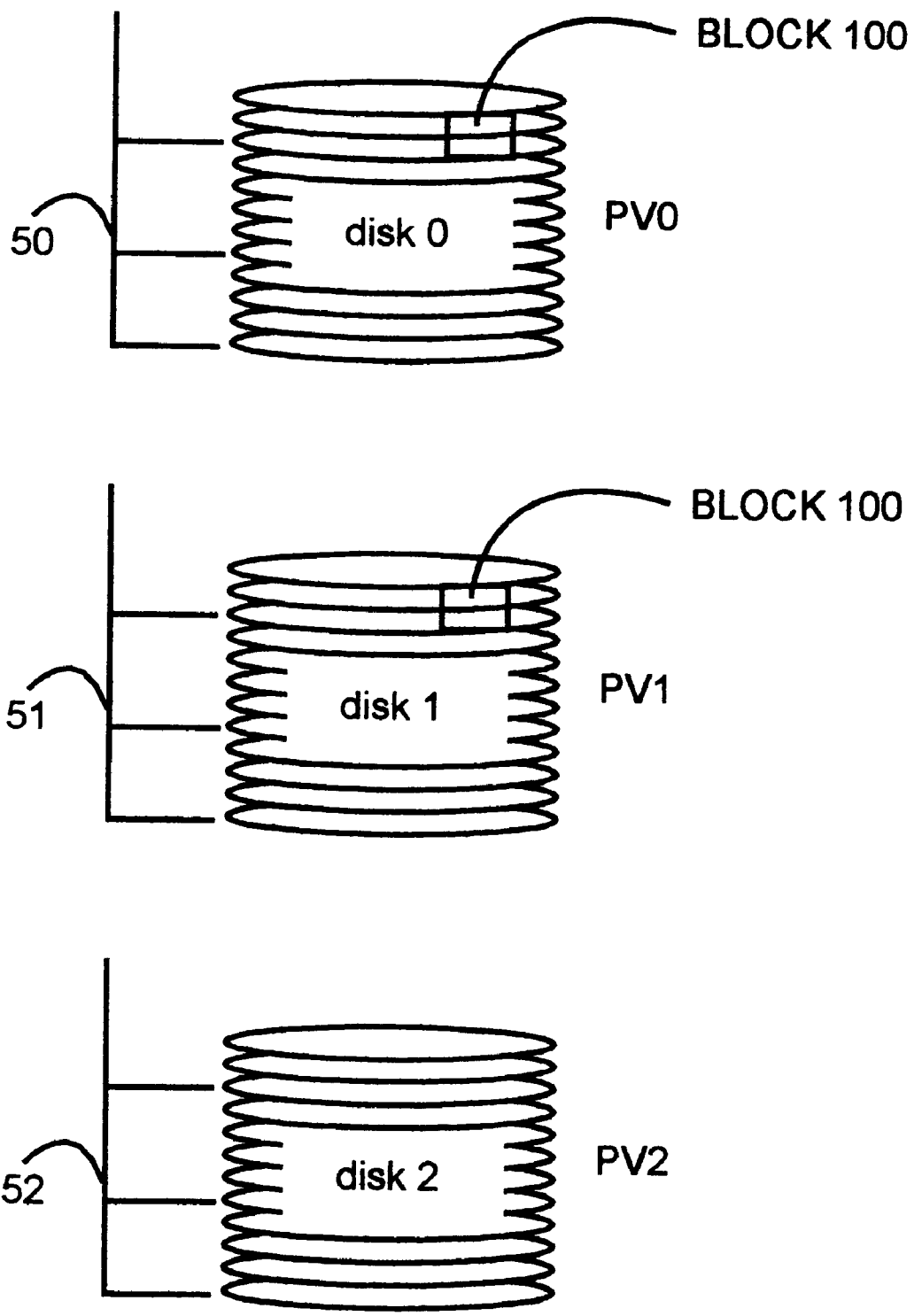
FIG. 3 is a generalized diagram of a physical hard drive for carrying out some of the logic functions described with respect to FIG. 2.

FIG. 3 shows how this may be implemented on the PVs, i.e. disk drives. Disk drives 0, 1 and 2, respectively, are PVs: PV0, PV1 and PV2, and are respectively divided into sets of physical partitions 50, 51 and 52. The mirrored corresponding LV data need not be stored in contiguous, or even corresponding, positions on the PVs. They may be stored at randomly assigned positions in these disk drives. For example, Block 100 of a LV is stored in one position on PV0, and the same data is mirrored on a different PV, PV1 and at a different position. This will be discussed further with respect to the flowcharts of FIGS. 4 and 5.

Figure 4:
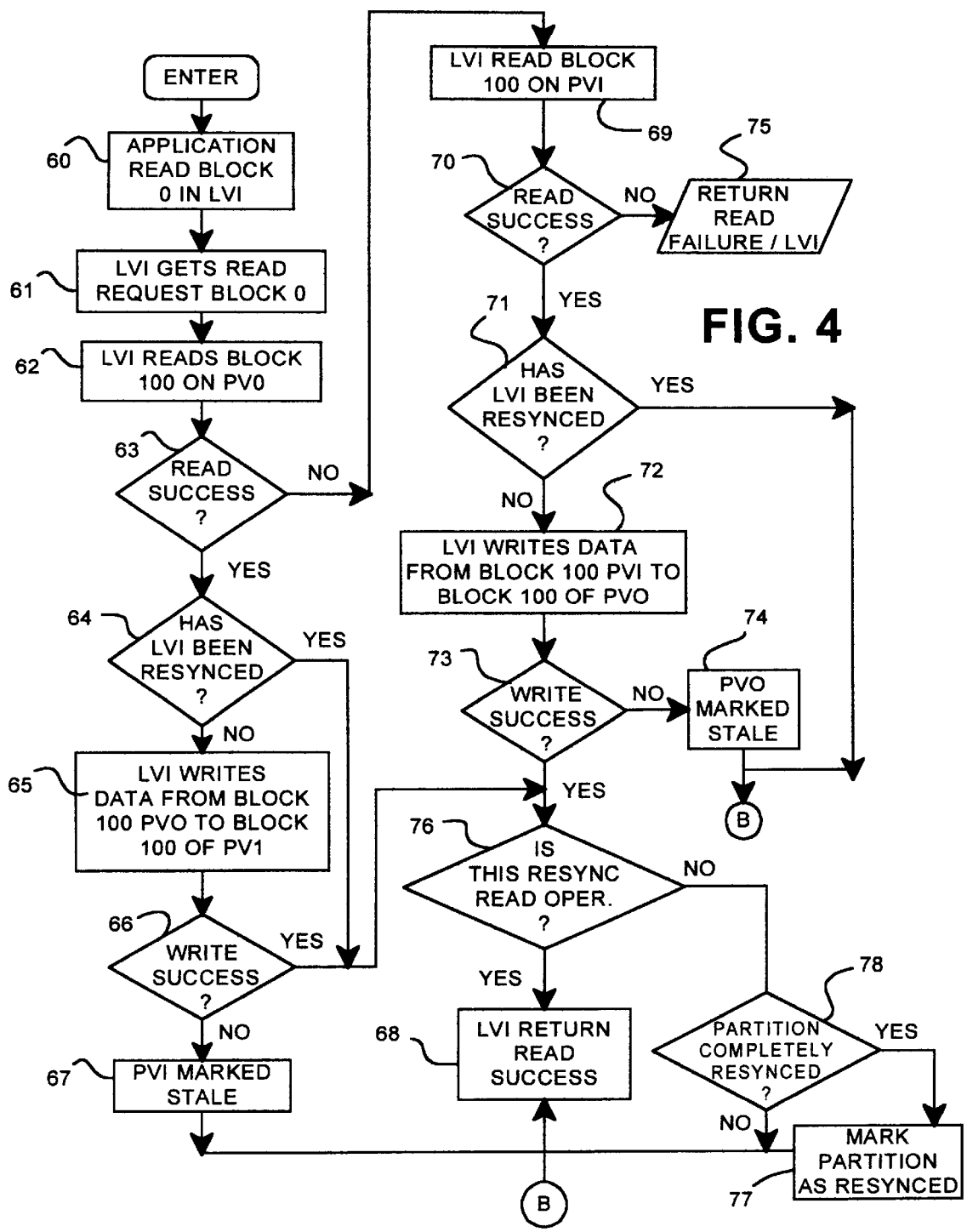
FIG. 4 is a flowchart of the running of one version of the dynamic resynchronization program of the present invention.

FIG. 4 is a flowchart of one version of the dynamic resynchronization process of the invention. The assumption is that there has previously been a system failure resulting in the need to resynchronize the storage system and that a sequential resynchronization of the LVs in the system has commenced but is not yet completed. Immediately after the system failure, a signal is set at each LV indicating the need for resynchronization, and during the sequential resynchronization process, as each LV is reached and resynchronized, this resync need signal is removed from the resynchronized LV. Thus, while this resynchronization is going on, the storage system is also being normally accessed. Also, for convenience in description, we will assume that the mirrored data is contained in two rather than three LPs. In step 60, an application on the data processing system requests a read of Block 0 on a LV, LV1 (the particular logic and PVs are respectively illustrated in FIGS. 2 and 3). Thus, in step 61, LV1 gets a read request for Block 0. The logical data in LV1, Block 0, is in mirrored LPs, which are physically stored as shown at the location Block 100, respectively mirrored in PVs, PV0 and PV1, as shown in FIG. 3. Accordingly, step 62, the process first tries to read Block 100 on PV0. Then, a determination is made in decision block 63 as to whether the read has been a success. If Yes, then, decision step 64, a determination is made as to whether LV1 has already been resynchronized in the ongoing sequential resynchronization process. If the decision from step 64 is Yes, then the process assumes that it has a normal read operation and branches to step 68 via branch "B" where LV1 returns a read success signal. If the determination from step 64 is No, then, step 65, LV1 writes the data in Block 100, which has already been read from PV0 into Block 100 in PV1 so that the mirrored data is fully identical. Then, step 66, a determination is made as to whether this write has been successful. If the determination from step 66 is No, then it is assumed that the PV1 partition containing Block 100 is stale and PV1 is so marked, step 67, after which, LV1 returns a read success signal, step 68. By marking this PV1 partition as stale, the process prevents subsequent data read requests from reading this PV1 partition until the resynchronization process reaches the partition and corrects the problem. If the determination from step 66 is Yes, then, step 76, a determination is made as to whether this particular read is a read which is part of a resynchronization operation. If Yes, then LV1 returns a read success signal, step 68. If the decision from step 76 is No, then a determination is made, step 78, as to whether the partition being read from has been completely resynchronized. If No, then the process goes to step 68 and LV1 returns a read success signal. If the decision from step 78 is Yes, then step 77, the partition is indicated as resynchronized.

Let us now return to decision step 63 and track the process in the event of a No decision, i.e. LV1 cannot read Block 100 on PV0. Then, step 69, LV1 tries to read the mirrored Block 100 on PV1 and a determination is made, step 70, as to whether the read was successful. If No, then since both of the mirrored PV locations are unreadable, the process returns a read failure signal to LV1, step 75. However, if Yes, the read was a success, then decision step 71, a determination is made as to whether LV1 has already been resynchronized in the ongoing sequential resynchronization process. If Yes, then the process assumes that it has a normal read operation and, via branch "B", LV1 returns a read success signal, step 68. If the determination from step 71 is No, then, step 72, LV1 writes the data, Block 100, which has already been read from PV1, into Block 100 in PV0 so that the mirrored data is fully identical. Then, step 73, a determination is made as to whether this write has been successful. If the determination from step 73 is No, then it is assumed that the PV0 partition containing Block 100 is stale and PV0 is so marked, step 74, after which LV1 returns a read success signal, step 68, via branch "B". By marking this PV0 partition as stale, the process prevents subsequent data read requests from reading this PV1 partition until the resynchronization process reaches the partition and corrects the problem. If the determination from step 73 is Yes, then the process flows to decision step 76 where a determination is made as to whether the read is part of a resynchronization operation and the procedure continues as described above.

Figure 5:
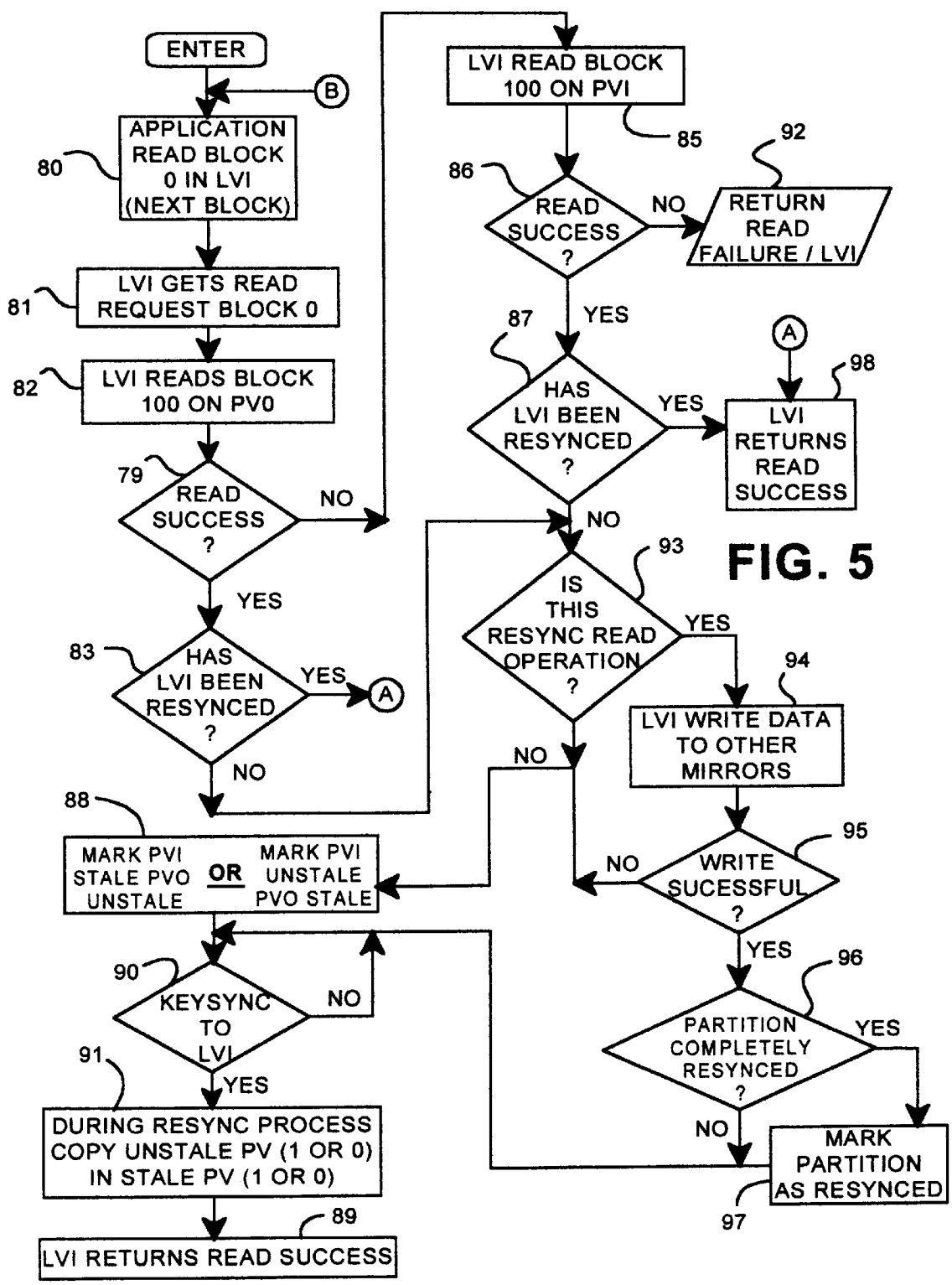
FIG. 5 is a flowchart of the running of an alternate version of the dynamic resynchronization program of the present invention.

The process described with respect to FIG. 5 provides an alternative version of dynamically resynchronizing storage systems. Here again, as in the first version described above, as resynchronization is going on, the storage system is also being normally accessed. Also, for convenience in description, we will assume that the mirrored data is contained in two rather than three LPs. In step 80, an application on the data processing system requests a read of Block 0 on a LV, LV1 (the particular logic and PVs are respectively illustrated in FIGS. 2 and 3). Thus, in step 81, LV1 gets a read request for Block 0. The logical data in LV1, Block 0, is in mirrored LPs, which are physically stored as shown at the location Block 100 respectively mirrored in PVs, PV0 and PV1, as shown in FIG. 3. Accordingly, step 82, the process first tries to read Block 100 on PV0. Then, a determination is made in decision block 79 as to whether the read has been a success. If Yes, then, decision step 83, a determination is made as to whether LV1 has already been resynchronized in the ongoing sequential resynchronization process. If Yes, then the process assumes that it has a normal read operation and the process proceeds via branch "A" to step 98 wherein LV1 returns a read success signal. If the determination from step 83 is No, then, the process goes to decision step 93 where a determination is made as to whether the read data was part of a resynchronization operation. If No, then, step 88, the partition in PV0 where Block 100 was successfully read is marked as active or unstale and the mirrored Block 100 partition in PV1, which was unread, is marked as stale. Thus, all future reads of Block 100 prior to resync will only be from the unstale partition in PV0.

At this point, let us consider the effect of a No decision from step 79 above, i.e. the read from PV0 was unsuccessful. Then, step 85, LV1 tries to read the mirrored Block 100 on PV1, and a determination is made, step 86, as to whether the read was successful. If No, then since both of the mirrored PV locations are unreadable, the process returns a read failure signal to LV1, step 92. However, if Yes, the read was a success, then decision step 87, a determination is made as to whether LV1 has already been resynchronized in the ongoing sequential resynchronization process. If Yes, then the process assumes that it has a normal read operation and LV1 returns a read success signal, step 98. If the determination from step 87 is No, then, the process goes to decision step 93 where a determination is made as to whether the read data was part of a resynchronization operation; if No, then, step 88, the partition in PV1 where Block 100 was successfully read is marked as active or unstale and the mirrored Block 100 partition in PV0, which was unread, is marked as stale. Thus, all future reads of Block 100 prior to resync will be only from the unstale partition in PV1. Then, decision step 90 tracks the occurrence of LV1 resynchronization (Yes). During this resynchronization process, step 91 the unstale PV(1 or 0) will be copied into the stale PV(1 or 0); after which, step 89, LV1 returns a read success signal.

Let now consider the effect of a Yes decision from step 93, i.e. that the read data was part of a resynchronization operation. Then, step 94, LV1 will try to write the read data to the other mirrored partition. If unsuccessful (No), step 95, then the process goes back to step 88 where the successfully read partition is marked unstale while its unwritten counterpart is marked stale. On the other hand, if the decision from step 95 is that the write was successful, then, a determination is made, step 96, as to whether the partition being read from has been completely resynchronized. If No, then the process goes to step 90 where the resynchronization is tracked as described above. If the decision from step 96 is Yes, then step 97, the partition is indicated as resynchronized.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a data processor controlled data storage system having a system for storing data in a plurality of logical volumes, each of said logical volumes divided into a plurality of mirrored logical data partitions, a system for dynamically resynchronizing after the correction of a storage system problem comprising:
    means for resynchronizing, after the correction of said problem, each of said plurality of logical volumes,
    means for accessing, after the correction of said problem, unresynchronized data from one of said logical volumes, and
    means for copying said accessed data into a mirrored partition.

2. In a data processor controlled data storage system having a system for storing data in a plurality of logical volumes, each of said logical volumes divided into a plurality of mirrored logical data partitions, a system for dynamically resynchronizing after the correction of a storage system problem comprising:
    means for resynchronizing, after the correction of said problem, each of said plurality of logical volumes,
    means for accessing, after the correction of said problem, data from a logical data partition in a portion of one of said logical volumes,
    means for determining whether said one logical volume portion containing the accessed partition has been resynchronized prior to access, and
    means responsive to said determining means for replacing data in the other mirrored partitions in said logical volume with the accessed date in said accessed partition in the event that said one logical volume has not been resynchronized.

3. The data storage system of claim 2 wherein said means for replacing the data in the other mirrored partitions replace the data prior to resynchronization of said one logical volume.

4. The data storage system of claim 2 wherein said means for replacing the data in the other mirrored partitions replace the data during the resynchronization of said logical volume.

5. The data storage system of claim 4 further including:
    means responsive to the successful accessing of data from said data partition for indicating said partition as accessible and for indicating the other mirrored partitions in said one logical volume as inaccessible, and
    means for removing said indicators from said partitions upon resynchronization of said accessed set.

6. The storage system of claim 5 wherein:
    said means for indicating said partition as accessible is an unstale data indicator, and
    said means for indicating the other mirrored partitions as inaccessible is a stale data indicator.

7. The data storage system of claim 2 wherein said means for determining whether said one Logical volume containing the accessed logical partition has been resynchronized includes:
    means responsive to the occurrence of a storage system problem for setting a resynchronization indicator for each of said logical volumes, and
    means for removing said resynchronization indicator from each of said logical volumes upon the resynchronization of each logical volume.

8. In a data processor controlled data storage system having a system for storing dater in a plurality of logical volumes, each of said logical volumes divided into a plurality of mirrored logical data partitions, a method for dynamically resynchronizing after the correction of a storage system problem comprising the steps of;
    resynchronizing, after the correction to said problem, each of said plurality of logical volumes,
    accessing, after the correction of said problem, unresynchronized data from one of said logical volumes, and
    copying said accessed data into a mirrored partition.

9. In a data processor controlled data storage system having a system for storing data in a plurality of logical volumes, each of said logical volumes divided into a plurality of mirrored logical data partitions, a method for dynamically resynchronizing after the correction of a storage system problem comprising the steps of:
    resynchronizing, after the correction of said problem. each of said plurality of logical volumes,
    accessing, after the correction of said problem, data from a data partition in a portion of one of said logical volumes,
    determining whether said one logical volume portion containing the accessed partition has been resynchronized prior to access, and
    replacing data in the other mirrored partitions in said logical volume with the accessed data in said accessed partition in the event that said one logical volume has not been resynchronized.

10. The dynamic resynchronization method of claim 9 wherein said step of replacing the data in the other mirrored partitions replaces the data prior to resynchronization of said one logical volume.

11. The dynamic resynchronization method of claim 9 wherein said step of replacing the data in the other mirrored partitions replaces the data during the resynchronization of said one logical volume.

12. The dynamic resynchronization method of claim 11 further including the steps of:
    responsive to the accessing of data from said data partition for indicating said partition as accessible and for indicating the other mirrored partitions in said one logical volume as inaccessible, and removing said indicators from said partitions upon resynchronization of said accessed set.

13. The dynamic resynchronization method of claim 12 wherein:

said partition is indicated as accessible by an unstale data indicator, and the other mirrored partitions are indicated as inaccessible by a stale data indicator.

14. The dynamic resynchronization method of claim 9 wherein said step of determining whether said one logical volume containing the accessed partition has been resynchronized includes:

setting a resynchronization indicator for each of said logical volumes responsive to the occurrence of a storage system problem, and removing said resynchronization indicator from each of said logical volumes upon the resynchronization of each logical volume.

15. A computer program having program code included on a computer readable medium for dynamically resynchronizing after the correction of a storage system problem in a data processor controlled data storage system having a system for storing data in a set of mirrored logical volumes divided into a plurality of sets of mirrored data partitions comprising;

means for resynchronizing, after the correction of said problem, each of said plurality of logical volumes, means for accessing, after the correction of said problem, unresynchronized data from one of said logical volumes, and means for copying said accessed data into a mirrored partition.

16. A computer program having program code included on a computer readable medium for dynamically resynchronizing after the correction or a storage system problem in a data processor controlled data storage System having a system for storing data in a set of mirrored logical volumes divided into a plurality of sets of mirrored data partitions comprising:

means for resynchronizing, after the correction of said problem, each of said plurality of logical volumes, means for accessing, after the correction of said problem, data from a logical data partition in a portion of one of said logical volumes, means for determining whether said one logical volume containing the accessed partition has been resynchronized prior to access, and means responsive to said determining means for replacing data in the other mirrored partitions in said logical volume with the accessed data in said accessed partition in the event that said one logical volume has not been resynchronized.

17. The computer program of claim 16 wherein said means for replacing the data in the other mirrored partitions replace the data prior to resynchronization of said one logical volume.

18. The computer program of claim 16 wherein said means for replacing the data in the other mirrored partitions replace the data during the resynchronization of said logical volume.

19. The computer program of claim 18 wherein said means for determining whether said one logical volume containing the accessed logical partition has been resynchronized includes:

means responsive to the occurrence of a storage system problem for setting a resynchronization indicator for each of said logical volumes, and means for removing said resynchronization indicator from each of said logical volumes upon the resynchronization of each logical volume.

20. The computer program of claim 18 further including:

means responsive to the successful accessing of data from said data partition for indicating said partition as accessible and for indicating the other mirrored partitions in said one logical volume as inaccessible, and means for removing said indicators from said partitions upon resynchronization of said accessed set.

21. The computer program of claim 20 wherein:

said means for indicating said partition as accessible is an unstale data indicator, and said means for indicating the other mirrored partitions as inaccessible is a stale data indicator.

* * * * *